United States Patent Office 2,772,737
Patented Dec. 4, 1956

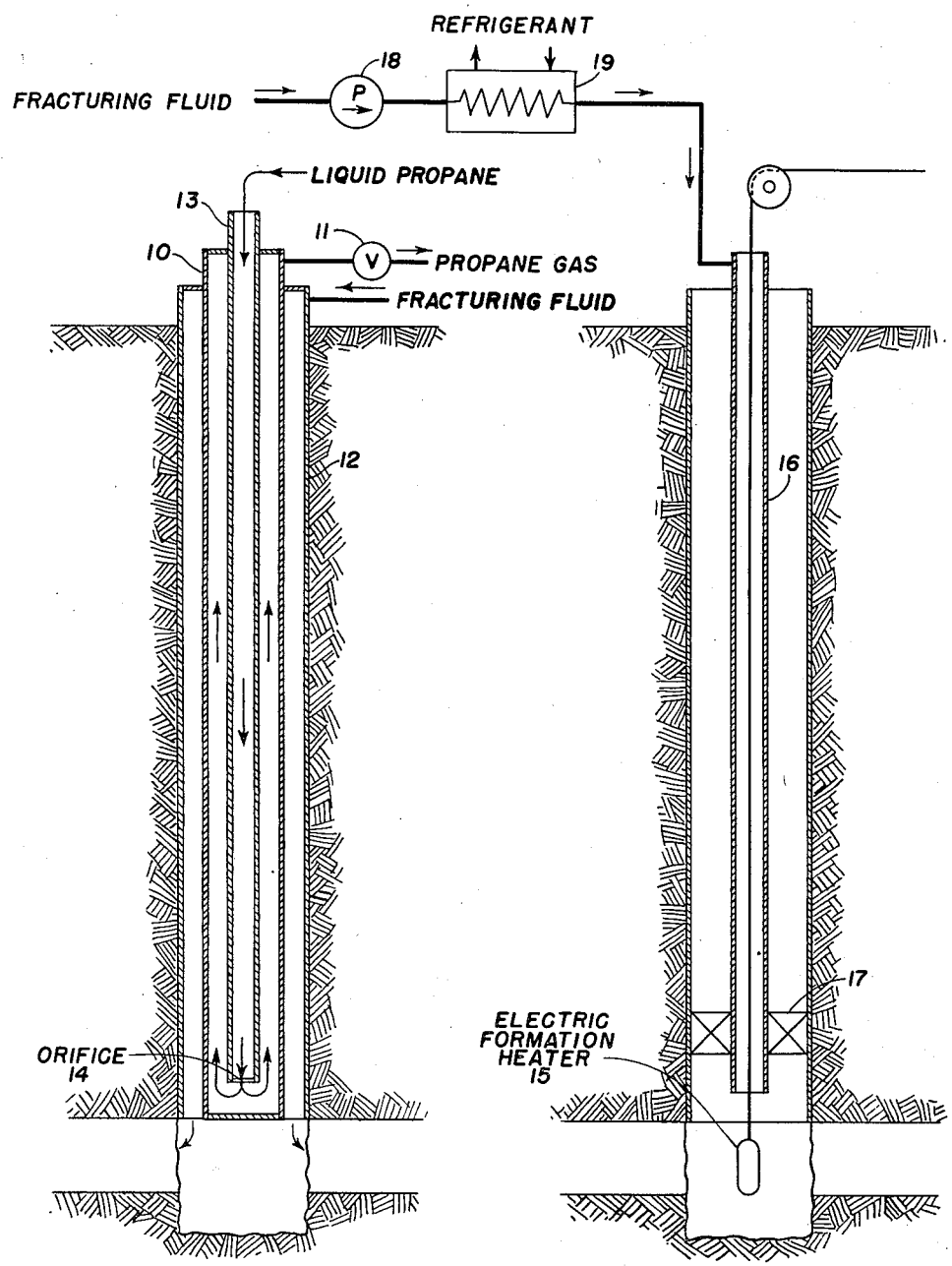

2,772,737

FRACTURING OIL AND GAS PRODUCING FORMATIONS

Donald C. Bond and Orrin C. Holbrook, Crystal Lake, Ill., assignors to The Pure Oil Company, Chicago, Ill., a corporation of Ohio Application December 21, 1954, Serial No. 476,851

8 Claims. (Cl. 166—22)

This invention relates to a method for increasing the productivity of subterranean geological formations traversed by a bore hole. It is more specifically concerned with the development and exploitation of fluid-producing reservoirs by means of a hydraulic fracturing technique for use in well completion and stimulation.

The fracturing of hard, close-grained geological formations by externally applied forces has long been an established well completion technique. In carrying out squeeze-cementing and acidizing using relatively high application pressures, the pressure-parting phenomenon has been noted as an incidental effect. However, this principle is also employed in commercial processes where the primary objective is to increase the permeability, and open formation channels by developing fractures within the producing formation about the well bore. Initial fracturing efforts were directed to the use of explosives such as nitroglycerine and dynamite, etc., to provide necessary fracturing forces. It is still common practice to employ this expedient in reservoir exploitation work, especially in secondary recovery operations in the reconditioning of water-injection wells where a plurality of short formation fractures is more desirable than a few extensive fractures which would cause channeling and bypassing of the formation medium. Another means which has been developed for the application of disruptive forces to effect the fracturing of formations involves the use of a fluid medium for transmitting pressure. In carrying out this type of process, a viscous fluid is pumped into the formation. Through a combination of the flow characteristics of the fracturing fluid and the lithological attributes of the formation being treated, a sufficient resistance to fluid flow is developed within the formation which permits a pressure to build up within the formation. Through the use of properly designed pumping equipment of adequate capacity, a pressure sufficient to develop fractures in the formation can be developed. In all instances it is not necessary to exceed the overburden pressure because fracturing can occur at pressures as low as 0.7 times the overburden pressure. It is evident that the selection of a fracturing fluid having suitable fluidity characteristics will be determined by the permeability properties of the formation being treated. In relatively tight formations an inherently highly viscous fluid, such as a crude oil, can be employed. This fluid has sufficient resistance to flow to permit the building up of fracturing pressures. However, in formations of normal permeability, the use of such materials requires a high pumping rate in order to develop a formation-fracturing pressure, and precludes their practical use in the fracturing process. To overcome this disadvantage, the "Hydrafrac" method of fracturing formations to increase the productivity was developed. As in other pressure-parting techniques, this process involves the introduction into the formation of a viscous liquid under high enough pressure to fracture the formation. The viscous liquid employed is a substance having low fluidity characteristics which make the fluid resistant to flow under pressure. Sufficient fluidal resistance is developed in the fracturing fluid by admixing a gelling agent, such as an aluminum soap of high molecular weight in a suitable liquid petroleum base such as kerosene, crude oil or the like, although other types of base fluids may be employed in the formulation of the fracturing fluid. A fracturing fluid of this nature has low formation-penetrating characteristics which permit the development of fracturing pressures within the formation. It is, however, necessary to modify the basic composition of a fracturing fluid of this nature so as to permit the fracturing fluid to flow back out of the formation after the fracture has been made. This requires the use of peptizing agents or gel breakers which modify the gel structure of the fracturing fluid to produce a fluid of thin consistency approximating that of the hydraulic base fluid. In using a gelled fluid of this nature, there are a number of disadvantages, such as the necessity for gel breakers, incomplete reversion of the gel to a lower consistency, emulsification of gel and water, the high pressure drop when injected through tubing, etc.

Therefore, it is an object of this invention to provide a hydraulic fracturing process employing a fracturing fluid to which low formation-penetrating characteristics are imparted, without the use of gelling agents or other bodying materials. This and other objects will become apparent from the following detailed discussion of this invention.

Figure 1 is a diagrammatic illustration showing a cross-section of a well bore in which is placed an apparatus employed to fracture a formation in accordance with this invention.

Figure 2 is a cross-sectional view of a bore hole showing an alternative expedient for producing the fracturing fluid employed in this invention. Also shown in this figure is a heat transfer expedient which can be utilized to increase the fluidity of the fracturing fluid in order to expedite its removal from the formation.

According to this invention, the fracturing of fluid-producing, geological formations can be effected by a hydraulic fracturing process in which the pressure-transmitting medium is a liquid which has an inherent high rate of change of viscosity with temperature, a property which will be characterized in the following discussion and appended claims by the expression "high, viscosity-temperature coefficient." Preferably, the fluid used is one whose viscosity is increased by a factor of 10 to 100 or more by a decrease in temperature of 25° to 50° F. below the reservoir temperature in the reservoir being treated. Thus, sufficient fluidal resistance is developed in the liquid to permit a fracturing pressure to be built up within the formation without the use of gelling agents by cooling the fracturing fluid of this invention to a temperature at which a desired thickened consistency is obtained. As has been pointed out in the prior art, a hydraulic fracturing fluid should have a viscosity of between about 50 and 500,000 centipoises or higher, depending upon the individual well conditions. Thus, satisfactory consistency can be obtained using thermal-reversible materials, which when cooled sufficiently will gel or otherwise develop a highly viscous state. Examples of liquids of this nature include, but are not limited to, low viscosity thermal-reversible compositions such as aqueous solutions of polyvinyl alcohols and the interpolymeric product formed by reacting acrylic acid or 2-substituted acrylic acid with acrylamide (U. S. Patents 2,506,537 and 2,476,527), aqueous gelatin, starch solutions, cellulose acetate-benzyl alcohol mixtures, and high pour point, low viscosity oils of animal, vegetable, or mineral origin. These substances, when cooled sufficiently, can be employed effectively as fracturing fluids in the hydraulic fracturing of geological formations. In carrying out this invention, a fluid having a high rate of change of viscosity with temperature is pumped into the well bore and refrigerated therein. One method of producing a fracturing fluid of high viscosity involves providing three concentric passageways in the well bore as shown in Figure 1. These can be the tubing 10 which is closed by a suitable valve 11, the annulus between the tubing and the casing 12 or wall of the well bore, and a "macaroni" string 13 inside the tubing. A refrigerant such as a liquid, normally gaseous refrigerant, e. g., propane, butane, sulfur dioxide, ammonia, and the fluorochloromethanes and -ethanes sold under the mark "Freon" by E. I. du Pont & Company, is pumped down the "macaroni" string 13 and is allowed to expand at the bottom of the tubing through orifice 14 positioned adjacent the terminal end of the "macaroni" string 13, returning in the gaseous phase to the surface through the tubing 10. Concomitant therewith, the fracturing fluid is pumped down the annulus, wherein it is cooled by indirect heat exchange caused by the expansion of the refrigerant in the tubing 10. Low penetrating characteristics are thus imparted to the fracturing fluid, and in this condition it is injected into the formation to be treated. Being in a semi-fluid state which is resistant to flow, it will penetrate the formation, but will resist flow therethrough. Accordingly, by continued pumping, pressure in an amount sufficient to fracture the formation can be built up within the formation interstices. After the fracture is made, the fluid is allowed to stand within the formation and is warmed up to ambient formation temperature. This reduces the consistency of the fracturing fluid so that it becomes thin enough to flow back out of the well without the use of gel breakers. Although this transformation may be effected without the use of heating substances, it may be desirable to expedite the change in fluidity by the application of heat from outside sources which may be transmitted by any conventional heat-transfer equipment used in well work. For example, an electrical resistance heater 15, such as is shown schematically in Figure 2 can be employed. In addition, steam coils or other types of heaters suitable for use in the removal of paraffin deposits from within the formation interstices, may be employed.

In refrigerating the fracturing fluid to produce a pressure-transmitting medium of sufficient fluidal resistance for use in hydraulic fracturing processes, other cooling expedients may also be employed. For example, solid carbon dioxide, preferably in the form of spheres or pellets, may be disposed within the well bore adjacent the formation to be treated. The fracturing fluid is then pumped into the well bore in contact with the solid carbon dioxide, and is cooled by direct heat exchange therewith. In its refrigerated condition, a fluid of low penetrating characteristics is developed which then may be pumped into the formation to saturate the formation near the well bore. This permits the application of a hydraulic pressure in an amount sufficient to produce fractures in the formation. It is also possible to employ refrigerating coils carrying circulating refrigerants disposed adjacent the formation, whereby the fracturing fluid is cooled by indirect heat exchange. In the treatment of shallow wells, it is also possible to refrigerate the liquid prior to its being introduced into the bore hole. This expedient may be used either with or without additional refrigeration within the well bore. This latter technique is also illustrated by Figure 2 which shows a tubing 16 disposed within an incased bore hole. The formation to be treated is isolated from the adjoining formation by a suitable formation packer 17. The fracturing fluid at ambient temperatures is transferred from a storage source not shown by pump 18 through refrigerator 19 in which it is transformed into a fracturing fluid of low penetrating characteristics. This relatively high viscosity fluid is then passed into the formation to be treated through tubing 16.

To illustrate the effectiveness of this invention, a sandstone formation, 10 feet thick and having permeability of 100 millidarcies, is treated. Located at a depth of 3,000 feet the formation has a bottom hole temperature of 90° F. Well tubing has been disposed within the well bore to facilitate the production of the oil from the producing formation. In order to carry out the hydraulic fracturing of the formation, a "macaroni" string is positioned within the well tubing, thus forming three concentric annular passageways. Liquefied propane is pumped down the "macaroni" string at a surface pressure of 500 p. s. i. Concomitant therewith, a mineral oil distillate in the lubricating oil range, having a pour point of 40° F., is pumped down the annulus formed by the outer wall of the well tubing and the well casing. The amount of propane which is introduced into the bore hole is regulated so that the mineral oil distillate is cooled to about a temperature of $-10°$ F. by the propane gas returning to the surface through the intermediate pasageway formed by the "macaroni" string and the tubing. At this temperature the viscosity of the mineral oil distillate is substantially increased to produce a fluid having low penetrating characteristics. This fluid is introduced into the formation at a surface pressure of 2000 p. s. i. and produces fractures in the formation.

Although the foregoing illustrative example was directed to the application of the invention in the fracturing of siliceous formations, this invention also may be employed in the treatment of calcareous or dolomitic formations. It is especially adaptable in the treatment of formations having permeabilities ranging from 1 to 1000 millidarcies. It is possible to treat subterranean reservoirs producing oil, gas or water. It is obvious that the selection of the fracturing fluid will depend upon the temperature of the formation which is being treated. Normally, the formation temperature will increase as the depth of bore hole increases. The formation temperature increases at varying rates, depending upon stratigraphic conditions. Accordingly, no specific relation between temperature and depth can be categorically set forth. Normally, the temperature increases about one degree for every 50–60 feet of depth. However, abnormalities in temperature gradients occur which do not permit the strict application of this rule. Considerable discussion on well bore temperatures is found in the prior art. For example, an interesting compilation of well bore temperatures, as well as an empirical relationship existing between temperature and depth, as well as other variables, is found in Temperature Gradients, Van Orstrand, Problems of Petroleum Geology, at page 989 et seq., American Association of Petroleum Geologists, 1934. The instant invention is especially adaptable to the treating of geological formations having a temperature between about 80°–150° F.; however, formations having temperatures in excess of this may be treated, depending upon the characteristics of the sealant which is employed.

In general, the fracturing fluid which is employed will be cooled to a temperature of about 25°–50° F. below the transition point of the fracturing fluid at which point the fracturing fluid will revert from a gel or semi-solid state to the liquid state. While this is a preferred range, temperatures outside of this range may be employed and the temperature selected will depend upon a number of factors, such as characteristics of the fracturing fluid, heat-transfer characteristics of the formation, limitation in expedients for cooling the fracturing fluid, etc. Accordingly, it is preferred that the transition point at which the fracturing fluid will revert from the gel or semi-solid state to the liquid state be about 20° to 30° F. below normal formation temperature. If substances having transition points within this range are employed it will not be necessary to employ extreme measures for cooling the fracturing fluid. In addition, the fracturing fluid, after it has been employed to fracture the formation, will revert to the liquid state in a reasonable time without requiring assistance from external sources of heat. In using mineral, vegetable, or animal oleaginous substances, the selection of a suitable fracturing fluid can be made on the basis of pour point. In making the selection, it is preferred that the substance employed have a pour point within the above range of transition points. In the event that thermal-reversible colloidal systems are employed, it is possible to vary the transition point at which the sol will be transformed to the gel state by means of such conventional expedients as varying the concentration of gelling agent in the liquid vehicle, introducing inorganic salts into the sol, modifying the chemical characteristics of the gelling agent, etc. The use of such expedients will be obvious to and will depend upon the desires of those skilled in the art who are using the instant invention. It is to be recognized that uncertain conditions exist in subterranean formations. Therefore, it is advisable to provide a sufficient margin of safety to avoid retention of the fracturing fluid within the formation. This can be avoided by selecting a fracturing fluid which will revert to the liquid state substantially below the normal formation temperature.

In controlling the introduction of the fluid into the formation, it may be desirable to employ packers to isolate and confine the interval that is being treated. Conventional pumping equipment of sufficient capacity can be employed to provide sufficient pressure to effect the fracturing. It has been developed as a general rule that a pressure of about 0.5 to about 0.9 lb./sq. in. per foot of depth is sufficient to part the formation at depths of about 4,000 feet or more. In treating formations closer to the surface, the overburden pressure becomes less important and it is necessary to overcome the rock cementation effect to produce fractures. In these instances, pressures of less than about 4,000 lbs./sq. in. may be employed. In carrying out the instant invention, it is also desirable to resort to the use of spacing agents conventionally employed in the "Hydrafrac" process to retain the fractured formation in a propped-open condition. These spacing agents are inert, granular materials which are introduced into the formation admixed in the fracturing fluid. Although spacing agents such as metals, crushed shells or the like, have been suggested, it has been found that the use of siliceous particles, such as sand, is economical and expeditious.

As in prior art fracturing operations, the instant invention may be employed in combination with a conventional acidizing procedure. The acid may either be introduced prior to the introduction of the fracturing fluid in order to make the formation more receptive to fracturing, or subsequent to the fracturing step in order to complement and increase the effect on the permeability of the formation produced by the fracturing.

Accordingly, we claim as our invention:

1. A process for improving the penetrability characteristics of a subterranean, geological formation traversed by a well bore, which comprises introducing into said bore hole a low viscosity liquid having a high, viscosity-temperature coefficient, whereby the viscosity of said liquid at normal temperatures is increased at least tenfold by a decrease in temperature of 25° to 50° F. below the temperature of the formation being treated, cooling said liquid within said borehole sufficiently to produce a high-viscosity, thermal-reversible fracturing fluid having low penetrating characteristics, disposing said fluid adjacent said formation, and applying to said fracturing medium a pressure sufficient to overcome the overburden pressure of said formation and produce fractures therein.

2. A process for improving the penetrability characteristics of a subterranean, geological formation traversed by a well bore, which comprises introducing into said well bore a low viscosity, thermal-reversible liquid having a high, viscosity-temperature coefficient, whereby the viscosity of said liquid at normal temperatures is increased at least tenfold by a decrease in temperature of 25° to 50° F. below the temperature of the formation being treated, cooling within said borehole said liquid in the well bore by indirect heat exchange with a suitable refrigerant to produce a fracturing fluid having low penetrating characteristics by substantially increasing the viscosity of said liquid, and forcing said fracturing medium into said formation by applying a force thereto sufficient to overcome the overburden pressure of said formation and produce fractures therein.

3. A process in accordance with claim 2 in which said refrigerant is a normally gaseous refrigerant which has reverted to the gaseous phase from a liquid state.

4. A process for improving the penetrability characteristics of a subterranean, geological formation traversed by a well bore, which comprises introducing into said well bore a low viscosity, thermal-reversible liquid having a high, viscosity-temperature coefficient, whereby the viscosity of said liquid at normal temperatures is increased at least tenfold by a decrease in temperature of 25° to 50° F. below the temperature of the formation being treated, cooling within said borehole said liquid in the well bore by direct heat exchange with a suitable refrigerant to produce a highly viscous fracturing fluid having low penetrating characteristics, and forcing said fracturing fluid into said formation by applying a force thereto sufficient to overcome the overburden pressure of said formation and produce fractures therein.

5. A process in accordance with claim 4 in which the refrigerant is solidified carbon dioxide.

6. A process for improving the penetrability characteristics of a subterranean, geological formation traversed by a well bore, which comprises introducing into said bore a low viscosity, thermal-reversible liquid having a high, viscosity-temperature coefficient, whereby the viscosity of said liquid at normal temperatures is increased at least tenfold by a decrease in temperature of 25° to 50° F. below the temperature of the formation being treated, cooling within said borehole said liquid sufficiently to produce a fracturing fluid having high viscosity and low penetrating characteristics, applying to said cooled, fracturing fluid a pressure sufficient to overcome the overburden pressure of said formation and produce fractures therein, thereafter heating said cooled fluid to substantially reduce its viscosity, and withdrawing a liquid of reduced viscosity from said formation.

7. A process in accordance with claim 6 in which the viscosity of said cooled fluid is substantially decreased by maintaining it in contact with said formation for a time sufficient for said fluid to revert to a liquid of reduced viscosity.

8. A process in accordance with claim 6 in which the viscosity of said cooled fluid is substantially decreased by heating it with heat-transfer apparatus.

References Cited in the file of this patent

UNITED STATES PATENTS

| | | |
|---|---|---|
| 2,033,561 | Wells | Mar. 10, 1936 |
| 2,259,428 | Shelley | Oct. 14, 1941 |
| 2,336,168 | Eckel | Dec. 7, 1943 |
| 2,661,066 | Bond | Dec. 1, 1953 |

OTHER REFERENCES

The Oil and Gas Journal, September 6, 1954, pp. 109–110.